(12) United States Patent
Tsunoda

(10) Patent No.: US 8,919,489 B2
(45) Date of Patent: Dec. 30, 2014

(54) ELECTRIC POWER STEERING APPARATUS

(75) Inventor: Mikihiko Tsunoda, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/265,047

(22) PCT Filed: Sep. 20, 2011

(86) PCT No.: PCT/JP2011/005287
§ 371 (c)(1),
(2), (4) Date: Oct. 18, 2011

(87) PCT Pub. No.: WO2012/077264
PCT Pub. Date: Jun. 14, 2012

(65) Prior Publication Data
US 2013/0299269 A1  Nov. 14, 2013

(30) Foreign Application Priority Data

Dec. 7, 2010 (JP) ................................ 2010-272210

(51) Int. Cl.
*B62D 5/04* (2006.01)
*H02K 5/22* (2006.01)
*G01L 25/00* (2006.01)
*H02K 11/00* (2006.01)

(52) U.S. Cl.
CPC ............ *B62D 5/0409* (2013.01); *B62D 5/0406* (2013.01); *G01L 25/003* (2013.01); *H02K 11/0084* (2013.01); *H02K 5/225* (2013.01)
USPC ....................................... 180/443; 73/862.08

(58) Field of Classification Search
USPC ................. 180/443, 444; 73/862.08
See application file for complete search history.

(56) References Cited

U.S. PATENT DOCUMENTS

| 5,810,111 | A  | * | 9/1998 | Takeuchi et al. | ............... 180/443 |
| 6,268,669 | B1 | * | 7/2001 | Wakao et al. | ................ 310/67 R |
| 6,758,105 | B2 | * | 7/2004 | Viola et al. | ................. 73/862.08 |
| 6,851,509 | B2 | * | 2/2005 | Hayakawa et al. | ........... 180/444 |

(Continued)

FOREIGN PATENT DOCUMENTS

| JP | 2001-106097 A | 4/2001 |
| JP | 2004-182079 A | 7/2004 |

(Continued)

OTHER PUBLICATIONS

Japanese-language Office Action dated Jun. 18, 2013 with English translation (Eight (8) pages).

(Continued)

*Primary Examiner* — Anne Marie Boehler
*Assistant Examiner* — Maurice Williams
(74) *Attorney, Agent, or Firm* — Crowell & Moring LLP

(57) ABSTRACT

Connection terminals are provided for electrically connecting sensor terminals and through holes provided on a control substrate, and a control unit is provided with a frame of synthetic resin for holding the control substrate. The frame of synthetic resin is provided with: a connection terminal holding portion for holding one ends of the connection terminals connected to the through holes partially insert-molded and the other ends protruding outwardly from the frame of synthetic resin; and guide openings for guiding and making the sensor terminals insert therethrough so that the sensor terminals protruding from the outer circumference of the reduction gearbox extend to the position where the sensor terminals are connectable with the other ends of the connection terminals.

10 Claims, 6 Drawing Sheets

(56) References Cited

U.S. PATENT DOCUMENTS

| | | | |
|---|---|---|---|
| 6,903,473 B2* | 6/2005 | Matsuyama et al. | 310/71 |
| 6,989,616 B2* | 1/2006 | Okubo et al. | 310/64 |
| 7,488,184 B2* | 2/2009 | Yasuda et al. | 439/76.1 |
| 7,814,803 B2* | 10/2010 | Akiyama et al. | 73/862.333 |
| 7,909,130 B2* | 3/2011 | Morikawa et al. | 180/444 |
| 8,102,138 B2* | 1/2012 | Sekine et al. | 318/646 |
| 8,136,623 B2* | 3/2012 | Takashima et al. | 180/444 |
| 8,456,049 B2* | 6/2013 | Matsuda et al. | 310/71 |
| 2003/0116376 A1* | 6/2003 | Uryu et al. | 180/446 |
| 2005/0155811 A1* | 7/2005 | Chikaraishi | 180/444 |
| 2005/0167183 A1* | 8/2005 | Tominaga et al. | 180/444 |
| 2005/0268732 A1* | 12/2005 | Fujita et al. | 73/862.08 |
| 2006/0016274 A1* | 1/2006 | Hattori et al. | 73/862.08 |
| 2006/0169526 A1* | 8/2006 | Honbo et al. | 180/444 |
| 2006/0191356 A1* | 8/2006 | Chikaraishi | 73/862.331 |
| 2007/0007070 A1* | 1/2007 | Sakata et al. | 180/444 |
| 2007/0089927 A1* | 4/2007 | Kim et al. | 180/444 |
| 2007/0205038 A1* | 9/2007 | Tominaga et al. | 180/444 |
| 2007/0209864 A1* | 9/2007 | Segawa et al. | 180/446 |
| 2007/0246289 A1* | 10/2007 | Tominaga | 180/444 |
| 2008/0017438 A1* | 1/2008 | Kanda et al. | 180/443 |
| 2008/0024080 A1* | 1/2008 | Ogawa | 318/432 |
| 2008/0211356 A1* | 9/2008 | Kataoka et al. | 310/68 B |
| 2009/0050400 A1* | 2/2009 | Segawa | 180/446 |
| 2009/0120712 A1* | 5/2009 | Kashimoto et al. | 180/444 |
| 2009/0133955 A1* | 5/2009 | Morikawa et al. | 180/444 |
| 2009/0250287 A1* | 10/2009 | Takashima et al. | 180/444 |
| 2009/0255349 A1* | 10/2009 | Segawa | 73/862.325 |
| 2009/0272599 A1* | 11/2009 | Sekine et al. | 180/443 |
| 2010/0049403 A1* | 2/2010 | Gillman et al. | 701/43 |
| 2010/0101889 A1* | 4/2010 | Yamaguchi et al. | 180/444 |
| 2010/0126794 A1* | 5/2010 | Shiino et al. | 180/444 |
| 2010/0147620 A1* | 6/2010 | Ishihara et al. | 180/443 |
| 2010/0236859 A1* | 9/2010 | Kitahata et al. | 180/443 |
| 2010/0314192 A1* | 12/2010 | Nagase et al. | 180/444 |
| 2011/0066332 A1* | 3/2011 | Sonoda et al. | 701/42 |
| 2012/0318600 A1* | 12/2012 | Hakamata et al. | 180/220 |

FOREIGN PATENT DOCUMENTS

| | | |
|---|---|---|
| JP | 2004-233296 A | 8/2004 |
| JP | 2006-64587 A | 3/2006 |
| JP | 2007-232602 A | 9/2007 |
| JP | 2008-290616 A | 12/2008 |
| JP | 2009-23454 A | 2/2009 |
| JP | 2010-111248 A | 5/2010 |
| WO | WO 2007/007880 A1 | 1/2007 |

OTHER PUBLICATIONS

Japanese-language International Search Report (Form PCT/ISA/210) dated Dec. 27, 2011 (two (2) pages).

Japanese-language International Preliminary Report (Form PCT/ISA/237) dated Dec. 27, 2011 (three (3) pages).

International Preliminary Report on Patentability (PCT/IB/338 & PCT/IB/373) dated Jun. 20, 2013, including English translation of document C2 (Written Opinion (PCT/ISA/237)) dated Dec. 27, 2011 previously filed on Mar. 26, 2012 (six (6) pages).

English translation of reference C1 (Japanese-language International Search Report) previously filed on Mar. 26, 2012 (two (2) pages).

Chinese Office Action with English translation dated Jan. 3, 2014 (11 pages).

* cited by examiner

ELECTRIC POWER STEERING APPARATUS

TECHNICAL FIELD

The present invention relates to an electric power steering apparatus including a torque sensor for detecting a steering torque from torsion between an input shaft and an output shaft, and a control unit for drive-controlling an electric motor with the detection value of the torque sensor as control information.

BACKGROUND ART

As an electric power steering apparatus, there is known a mechatronically-integrated electric power steering apparatus. A control unit is mounted on a reduction gearbox, so that the control unit drive-controls an electric motor based upon information on a steering torque detected by a torque sensor and a steering assist force generated at the electric motor is transmitted via a worm reduction mechanism to a steering system.

For example, according to the mechatronically-integrated electric power steering apparatus described in Patent Document 1, a unit mounting surface is provided at the outer circumference of the reduction gearbox, the control unit having a control substrate incorporated therein is mounted on the unit mounting surface, and multiple sensor terminals connected to the torque sensor arranged in the reduction gearbox are made to protrude from the unit mounting surface. Then, multiple sensor terminals that protrude from the unit mounting surface are inserted into multiple through holes arranged on the control substrate of the control unit mounted on the unit mounting surface. The control substrate and multiple sensor terminals are directly soldered together to establish electrical connection.

PRIOR ART DOCUMENTS

Patent Documents

Patent Document 1: JP 2007-232602 A

SUMMARY OF THE INVENTION

Problem to be Solved

It is to be noted, however, that the structure, in which the sensor terminals of the torque sensor and the control substrate of the control unit are directly connected, causes the short circuit of the control unit due to splashing of solder, and adverse thermal influence on the component parts, and further raises a need for the provision of a splash prevention cover for a protection of the control unit. This increases the number of component parts in the control unit, and lots of labors and time for assembling them are necessitated.

Besides, in the control substrate, the width or length of pattern differs depending on the signal line, GND line, or the like. Hence, the thermal capacity of solder for connecting the sensor terminals and the control substrate tends to be non-uniform. This poses a possibility of making the process control complicated in order to ensure reliability of solder welding.

Therefore, the present invention has been made in view of the above unsolved problem of a conventional example, and has an object to provide an electric power steering apparatus, which makes it possible to prevent a defect caused by splashing of solder to the component parts of the control unit and to assemble the control unit with ease, and also makes it possible to improve the reliability of the connection structure by soldering the sensor terminals of the torque sensor and the control substrate of the control unit.

Problem to be Solved

In order to achieve the above object, according to one aspect of the present invention, there is provided an electric power steering apparatus comprising: a steering shaft through which a steering torque is transmitted; an electric motor for transmitting a steering assist force to the steering shaft via a reduction mechanism of a reduction gearbox; a control unit including a control substrate on which a control circuit for drive-controlling the electric motor is mounted; a plurality of sensor terminals connected to a torque sensor included in the reduction gearbox and protruding from an outer circumference of the reduction gearbox; a plurality of through holes arranged at the control substrate; and a plurality of connection terminals electrically connecting the plurality of sensor terminals and the plurality of through holes, respectively, wherein the control unit includes a frame of synthetic resin for holding the control substrate, wherein the frame of synthetic resin partially insert-molds the plurality of connection terminals with one ends of the plurality of connection terminals connected to the plurality of through holes, and the other ends of the plurality of connection terminals protruding at the outside of the frame of synthetic resin, wherein the frame of synthetic resin includes a sensor terminal holding portion having guide openings arranged at positions opposing open ends of the plurality of sensor terminals, and wherein the control unit are mounted on the reduction gearbox with the open ends of the plurality of sensor terminals being inserted into the guide openings, and the other ends of the plurality of connection terminals and the open ends of the plurality of sensor terminals are respectively connected by soldering together.

In the above electric power steering apparatus according to one aspect of the present invention, the other ends of the connection terminals and the open ends of the sensor terminals may only be connected by soldering together at the outside of the frame of synthetic resin. The thermal influence caused by splashing of solder is not given to the component parts such as the control substrate housed in the frame of synthetic resin. It is therefore possible to assemble the control unit with ease. In addition, soldering is carried out at the positions spaced apart from the control substrate, thereby ensuring the reliability of the sensor signals obtained from the torque sensor.

In addition, in the above electric power steering apparatus according to one aspect of the present invention, the open ends of the plurality of sensor terminals may extend toward a vehicle rear side; and the control unit may be mounted on the reduction gearbox while moving to a vehicle front side.

In addition, in the above electric power steering apparatus according to one aspect of the present invention, the through holes provided at the control substrate and the guide openings provided at the sensor terminal holding portion may be arranged in a direction where the control unit is mounted on the reduction gearbox.

In the above electric power steering apparatus according to one aspect of the present invention, it is possible to mount the control unit onto the reduction gearbox with ease.

In addition, in the above electric power steering apparatus according to one aspect of the present invention, the other ends of the connection terminals each may have a plate shaped land with a through hole, and the open ends of the sensor terminals and the lands are connected by soldering together with the open ends of the sensor terminals penetrating through the through holes after passing through the guide openings of the sensor terminal holding portion.

In the above electric power steering apparatus according to one aspect of the present invention, it is possible to carry out the soldering operation of the other ends of the connection terminals and the open ends of the sensor terminals with ease.

In addition, in the above electric power steering apparatus according to one aspect of the present invention, the other ends of the connection terminals may have a certain gap with the sensor terminal holding portion with opposing the sensor terminal holding portion.

In the above electric power steering apparatus according to one aspect of the present invention, there is a certain gap between each of the other ends of the connection terminals and the sensor terminal holding portion.

Therefore, at the time of soldering the open ends of the sensor terminals, the heat at the other ends of the connection terminals is not released to the sensor terminal holding portion, thereby enabling the soldering operation in an efficient manner.

In addition, the above electric power steering apparatus according to one aspect of the present invention may further comprise deformation preventing members for preventing the other ends of the connection terminal from deforming with the gap being arranged.

In addition, in the above electric power steering apparatus according to one aspect of the present invention, the deformation preventing members may be leg portions provided at side faces of the other ends, respectively, and the leg portions may abut a wall of the sensor terminal holding portion to prevent the other ends of the connection terminals from deforming.

In the above electric power steering apparatus according to one aspect of the present invention, the deformation preventing members prevent the other ends of the connection terminals from deforming. It is therefore possible to automate by machinery the connection operation of the other ends of the connection terminals and the sensor terminals.

In addition, in the above electric power steering apparatus according to one aspect of the present invention, the sensor terminal holding portion may have partition walls for partitioning between each connected pair of the other ends of the connection terminals and the open ends of the sensor terminals.

In the above electric power steering apparatus according to one aspect of the present invention, it is possible to prevent the solder from splashing to the adjacent connection terminals and the sensor terminals.

Advantageous Effects of the Invention

In the above electric power steering apparatus according to the present invention, the other ends of the connection terminals and the open ends of the sensor terminals may only be connected by soldering together at the outside of the frame of synthetic resin, of the control unit including the control substrate therein. It is possible to prevent a defect caused by splashing of the solder to the unit substrate, thereby improving the reliability of the connection structure in which the sensor terminals of the torque sensor and the control substrate of the control unit are soldered together. It is also possible to mount the control unit on the gearbox with a different reduction ratio, thereby improving the versatility of the control unit.

DESCRIPTION OF EMBODIMENTS

Hereinafter, preferred embodiments (hereinafter, referred to as embodiment) of the present invention will be described in detail with reference to the drawings.

Figure 1:
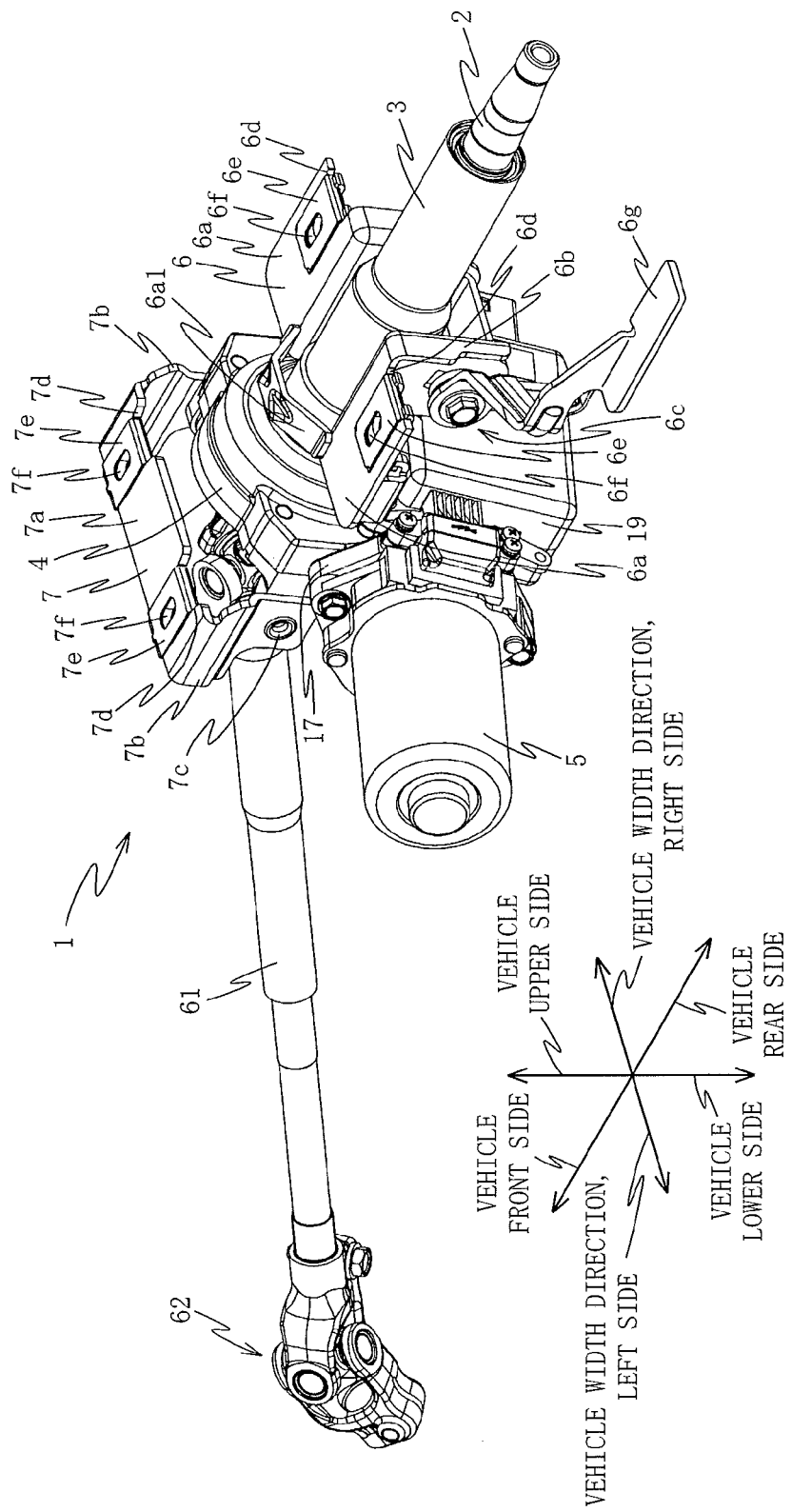
FIG. 1 is a perspective view, when viewed from the left direction, illustrative of a case where an embodiment of an electric power steering apparatus according to the present invention is applied to a vehicle with the steering wheel on the right side.
Figure 2:
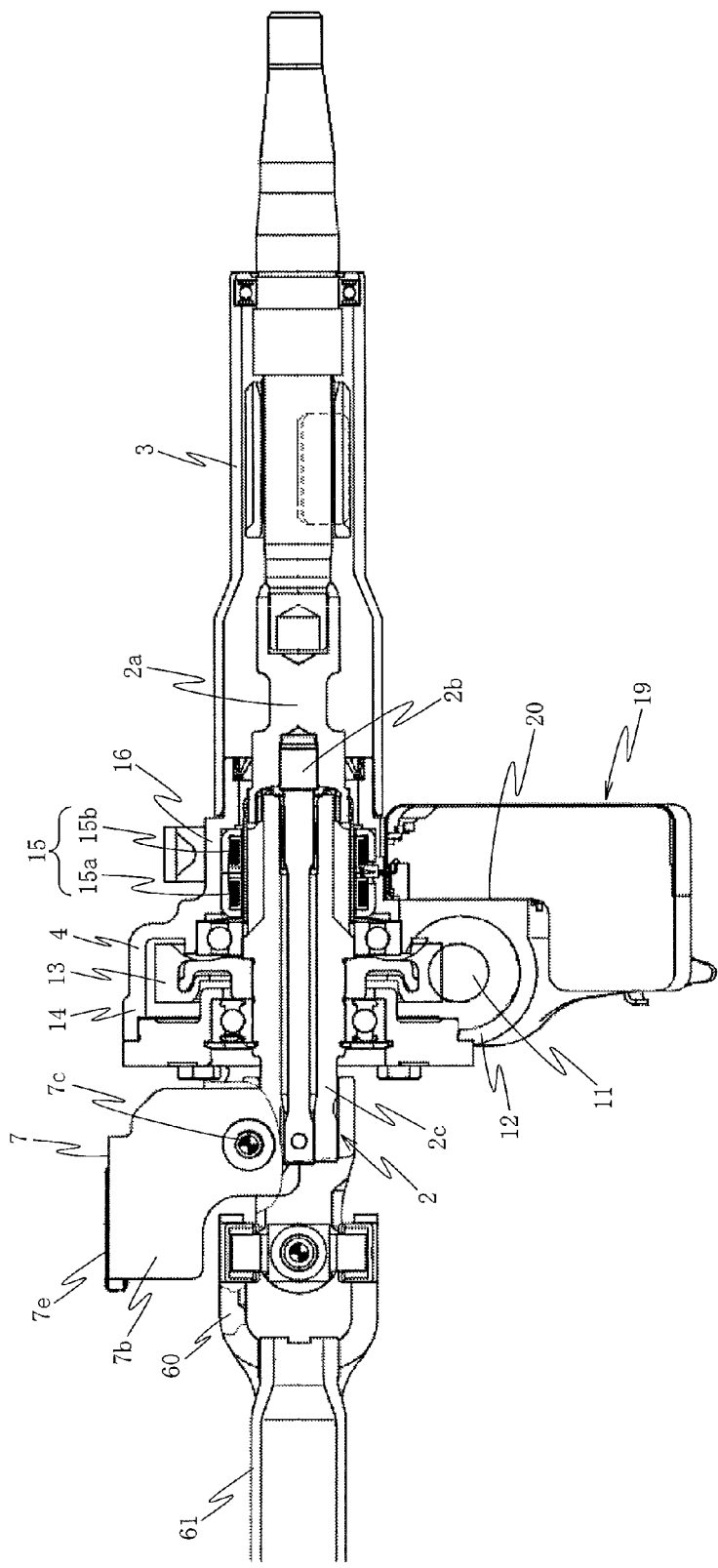
FIG. 2 is a longitudinal cross-sectional view illustrative of substantial parts of the electric power steering apparatus.

FIG. 1 is a perspective view of an electric power steering apparatus according to a first embodiment of the present invention when viewed from the driver's seat. FIG. 2 is a longitudinal cross-sectional view illustrative of substantial parts of the electric power steering apparatus.

Reference numeral 1 of FIG. 1 is a column-type electric power steering apparatus. A reduction gearbox 4 is coupled to a steering column 3 including a steering shaft 2 rotatably therein coupled to the steering wheel (not illustrated). With respect to the reduction gearbox 4, an electric motor 5 composed of a brush motor, and a control unit 19 are arranged such that the axial directions thereof are perpendicular to an axial direction of the steering column 3.

The steering shaft 2 is coupled to one end of a lower shaft 61 via a universal joint 60, and a pinion shaft (not illustrated) is coupled via a universal joint 62 to the other end of the lower shaft 61.

The steering column 3 and the reduction gearbox 4 are mounted on a vehicle body side by an upper mounting bracket 6 and a lower mounting bracket 7.

The lower mounting bracket 7 is composed of a mounting plate portion 7a and a pair of supporting plate portions 7b extending, in left-right direction in parallel with a predefined interval, from the lower surface of the mounting plate portion 7a. Then, the lower end of the supporting plate portion 7b is rotatably linked via a pivot 7c to a supporting portion (not illustrated) integrally formed on the vehicle front side of the reduction gearbox 4. In addition, a slit 7d is formed at the mounting plate portion 7a so that an uncoupling capsule 7e is fit to the slit 7d. The uncoupling capsule 7e has a bolt through hole 7f. The mounting plate portion 7a is mounted on a vehicle-side member (not illustrated) by screwing a fixing bolt (not illustrated) into the vehicle-side member, after penetrating through the bolt through hole 7f from the lower side of the uncoupling capsule 7e.

The upper mounting bracket 6 is provided with: a pair of mounting plate portions 6a; a coupling plate 6a1 for coupling the pair of mounting plate portions 6a; a pair of supporting plate portions 6b secured onto the lower ends of the pair of mounting plate portions 6a, respectively, and spaced apart from each other in the left-right (vehicle width) direction; and a tilt mechanism 6c formed, at the pair of supporting plate portions 6b, for supporting the steering column 3. In addition, the rotation of a tilt lever 6g of the tilt mechanism 6c releases the supporting state of the steering column 3, so that the tilt position of the steering column 3 is vertically adjustable with respect to the pivot 7c of the lower mounting bracket 7 as a center. Furthermore, a slit 6d is formed at each of the pair of mounting plate portions 6a, so that an uncoupling capsule 6e is fit to the slit 6d. The uncoupling capsule 6e has a bolt through hole 6f. The mounting plate portion 6a is mounted on a vehicle-side member (not illustrated) by screwing a fixing bolt (not illustrated) into the vehicle-side member, after penetrating through the bolt through hole 6f from the lower side of the uncoupling capsule 6e.

Referring now to FIG. 2, the steering shaft 2 is provided with: an input shaft 2a with an upper end coupled to the steering wheel (not illustrated); and an output shaft 2c, coupled to an lower end of the input shaft 2a via a torsion bar 2b, for covering the torsion bar 2b.

The reduction gearbox 4 is formed by, for example, diecast molding a material with high thermal conductivity, selected from any one of aluminum, aluminum alloy, magnesium, and magnesium alloy, for example.

Figure 3:
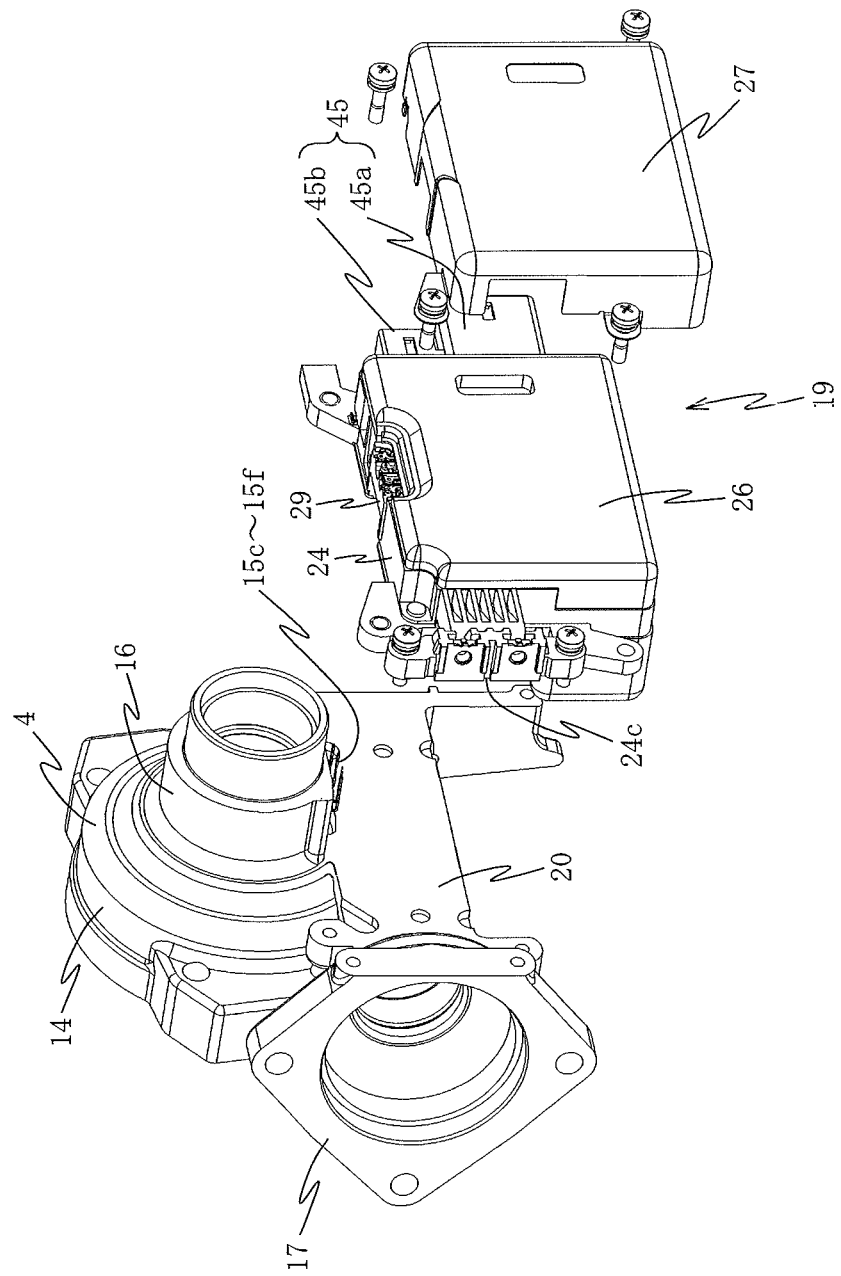
FIG. 3 is a perspective view illustrative of a structure of a control unit mounted on a reduction gearbox.

The reduction gearbox 4 is provided with: as illustrated in FIG. 2, a worm housing portion 12 for housing a worm 11 of a worm reduction gear coupled to an output shaft (not illustrated) of the electric motor 5; a worm wheel housing portion 14 having a center axis at the lower side of the worm housing portion 12 with the center axis perpendicular to a center axis of the worm housing portion 12, and for housing a worm wheel 13 meshed with the worm 11; a torque sensor housing portion 16 for housing a torque sensor 15 integrally and coaxially coupled on the vehicle rear side of the worm wheel housing portion 14; as also illustrated in FIG. 3, a motor mounting portion 17 for mounting the electric motor 5 formed at an open end surface of the worm housing portion 12; and a control unit mounting portion 20 for mounting the control unit 19 formed on a plane perpendicular to the center axis lines of the worm wheel housing portion 14 and the torque sensor housing portion 16 by partially extending to the worm housing portion 12 and the worm wheel housing portion 14.

The torque sensor 15 is configured, as illustrated in FIG. 2, such that the steering torque, obtained by magnetically detecting the torsion state between the input shaft 2a and the output shaft 2c of the steering shaft 2, is transmitted to the steering shaft, and the steering torque is detected by a pair of detection coils 15a and 15b. Sensor terminals 15c to 15f outwardly extending in parallel to the direction perpendicular to the center axis of the steering column 3 are respectively connected to the winding beginnings and the winding ends of the pair of detection coils 15a and 15b, as illustrated in FIG. 3. The sensor terminals 15c to 15f are each bent in a letter L shape at the midpoint in the lengthwise direction, and extend toward the vehicle rear side in parallel to the center axis of the steering column 3.

Figure 4:
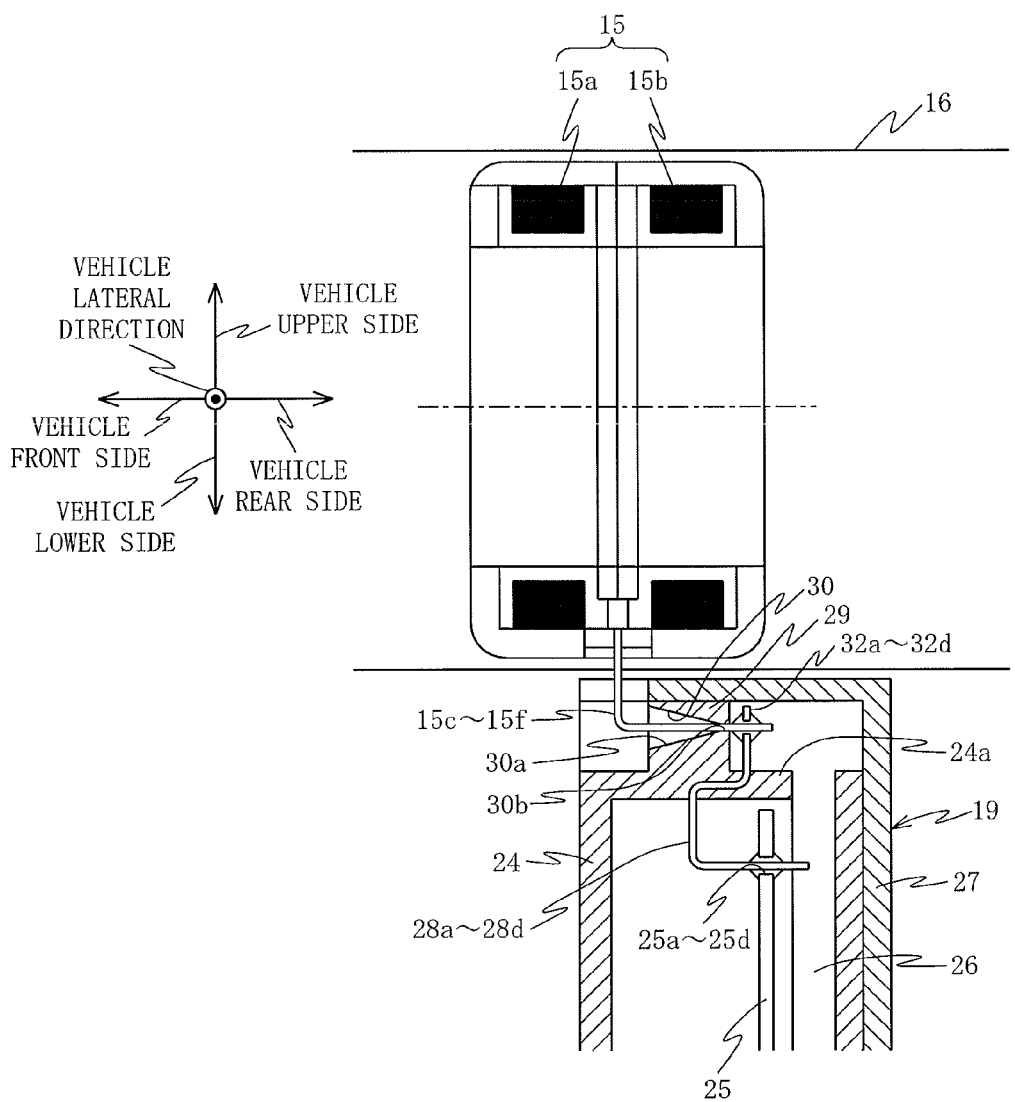
FIG. 4 is a view schematically illustrative of a connection state of sensor terminals of a torque sensor and through holes arranged in a control substrate of the control unit.

The control unit 19 mounted on a control unit mounting portion 20 of the reduction gearbox 4 is, as illustrated in FIG. 3 and FIG. 4, provided with: a frame 24 of synthetic resin; a control substrate 25; an inner cover 26; an outer cover 27; a power substrate (not illustrated); and four connection terminals 28a to 28d.

On the power substrate, discrete parts (not illustrated) are mounted, such as an H bridge circuit composed of a power switching element such as a field effect transistor for drive-controlling the electric motor 5, a pulse width modulation circuit for driving the power switching element of the H bridge circuit, and the like.

Through holes 25a to 25d, into which one ends of four connection terminals 28a to 28d are respectively inserted, are drilled on the control substrate 25, and one ends of the connection terminals 28a to 28d are soldered with the through holes 25a to 25d. Moreover, the control substrate 25 is connected to the sensor terminals 15c to 15f of the torque sensor 15 via the connection terminals 28a to 28d. The control substrate 25 calculates a steering assist current instruction value based upon the torque detection value from the torque sensor 15 or the vehicle speed detection value from the vehicle sensor, not illustrated. Then, the control substrate 25 carries out a current feedback control based upon the steering assist current instruction value and the detection value of the motor current to be output to the electric motor 5, and calculates a voltage instruction value to be applied to a pulse width modulation circuit of the power substrate. This permits the mounting of a Micro Control Unit (MCU) for controlling the steering assist force generated at the electric motor 5 and discrete parts of peripheral equipment or the like.

The frame 24 is a box-shaped member of synthetic resin for surrounding the power substrate and the control substrate 25. The frame 24 is provided with a terminal block 24c connected to the connection terminal of the electric motor 5 on the left end of FIG. 3, and a female connector 45 on the right end thereof. The female connector 45 is provided with: a power supply connector 45a; and a signal connector 45b for connecting with a network such as CAN for transmission and reception of data with control devices for the respective component parts of the vehicle.

The inner cover 26 is a cover of synthetic resin.

An outer cover 27 covers the inner cover 26 and surrounds the connection positions between the sensor terminals 15c to 15f and the connection terminals 28a to 28d. The outer cover 27 is a metal cover for blocking electromagnetic waves and protecting the mounted component parts.

In this situation, referring now to FIG. 4, a sensor terminal holding portion 29 for respectively insertion-holding the sensor terminals 15c to 15f extending toward the vehicle rear side is integrally formed at the outside of the frame 24.

The sensor terminal holding portion 29 is provided with four insertion holes 30 each having a tapered shape so that entrance side opening portions 30a into which the sensor terminals 15c to 15f are respectively inserted are opened wider than exit side opening portions 30b.

One ends of the four connection terminals 28a to 28d are soldered with the through holes 25a to 25d, respectively, and the other ends thereof are bent to extend toward the exit side opening portions 30b of the sensor terminal holding portion 29. In addition, the connection terminals 28a to 28d are partially insert-molded into a connection terminal holding portion 24a. Then, the other ends of the connection terminals 28a to 28d extend to the positions opposing the exit side opening portions 30b of the four insertion holes 30 at the sensor terminal holding portion 29. Leading ends of the sensor terminals 15c to 15f protruding toward the vehicle rear side from the four insertion holes 30 are soldered with the other ends of the connection terminals 28a to 28d.

Figure 5:
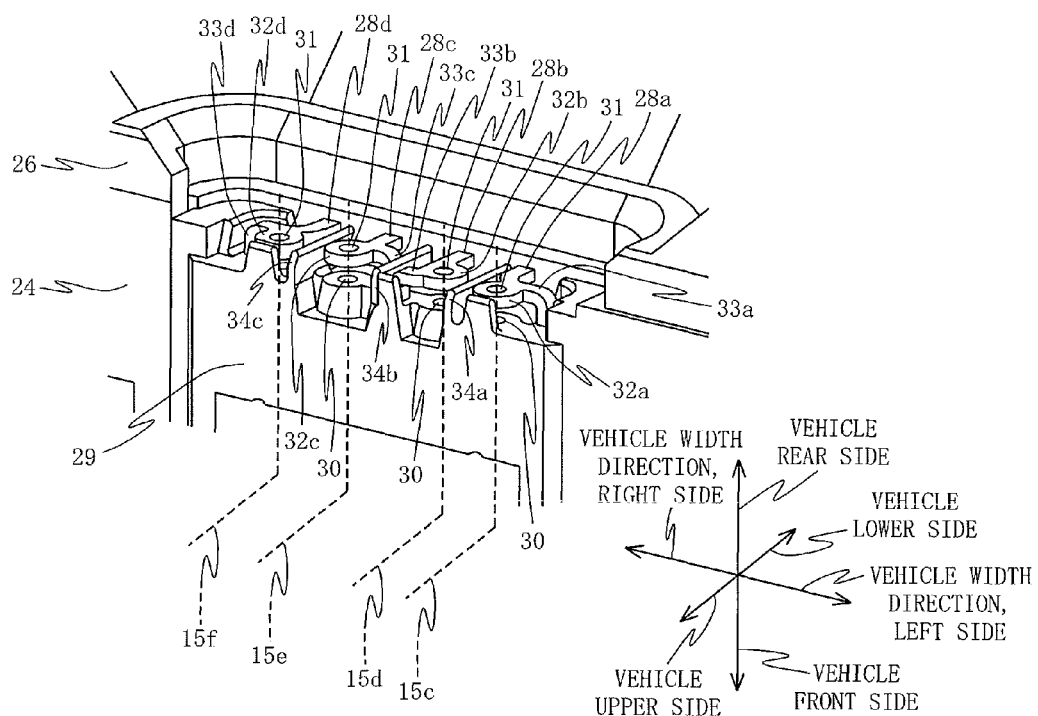
FIG. 5 is a perspective view illustrative of shapes of other ends of connection terminals connected to the sensor terminals and shapes of surrounding connection positions.

Referring now to FIG. 5, the other ends of the connection terminals 28a to 28d are each provided with: disk-shaped lands 32a to 32d formed with respect to a through hole 31, as a center, opposing the insertion holes 30 of the sensor terminal holding portion 29; and leg portions 33a to 33d extending toward a wall 29a of the sensor terminal holding portion 29 from the outer circumference of the lands 32a to 32d, respectively.

Figure 6:
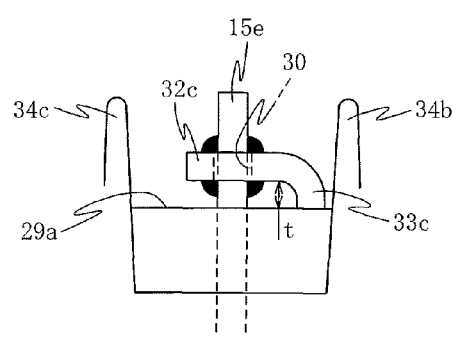
FIG. 6 is a view illustrative of the connection state of other ends of the sensor terminals and the connection terminals.

Referring now to FIG. 6, the land 32c formed at the leading end of the connection terminal 28c is disposed apart from the wall 29a with a certain gap t by abutting a leg portion 33c formed at the outer circumference of the land 32c with the wall 29a of the sensor terminal holding portion 29 having an insertion opening. Then, the sensor terminal 15e and the land 32c are soldered together with the sensor terminal 15e protruding toward the vehicle rear side from the insertion holes 30 penetrating through the through hole 31 of the land 32c. Additionally, although not illustrated, the lands 32a, 32b, and 32d formed at the leading ends of the other connection terminals 28a, 28b, and 28d are also disposed with a certain gap t apart from the wall by abutting the leg portions 33a, 33b, and 33d with the wall having an opening, respectively. The sensor terminals 15c, 15d, and 15f protruding toward the vehicle rear side from the insertion holes 30 are soldered with the lands 32a, 32b, and 32d with penetrating through the through holes 31, respectively.

Partition walls 34a to 34c for partitioning between the lands 32a to 32d of the connection terminals 28a to 28d, respectively, are arranged to protrude on the wall on which the insertion holes 30 of the sensor terminal holding portion 29 are arranged.

In this situation, a frame of synthetic resin according to the present invention corresponds to the frame 24, deformation preventing members according to the present invention corresponds to the leg portions 33a to 33d, and guide openings according to the present invention corresponds to the insertion holes 30.

The operation of the above embodiment will be described.

When the power is supplied from the battery to the power substrate and the control substrate 25 with the ignition switch, not illustrated, of the vehicle turned on, the steering assist control process is carried out by the Micro Control Unit (MCU). The steering assist current instruction value is calculated based upon the detection values of the torque sensor and the vehicle sensor, not illustrated. The current feedback process is carried out based upon the steering assist current instruction value and the motor current detected by the motor current detecting portion, and the voltage instruction value is calculated. The voltage instruction value is supplied to the gate driving circuit of the power substrate to control the H bridge circuit. Accordingly, the motor driving current is flown to the electric motor 5 to drive the electric motor 5 and generate the steering assist force necessary for the normal rotation or inverse rotation.

Thus, the steering assist force in response to the steering torque of the steering wheel is generated from the electric motor 5 and the steering assist force is transmitted to the output of the steering shaft 2 via the worm 11 and the worm wheel 13, thereby making it possible to steer the steering wheel with a light steering force.

Next, a description will be given of the effects of the mechatronically-integrated electric power steering apparatus 1 according to the present embodiment.

In the present embodiment, in connecting the sensor terminals 15c to 15f of the torque sensor 15 and the through holes 25a to 25d of the control unit 19, it is only necessary to connect by soldering the lands 32a to 32d of the connection terminals 28a to 28d and the sensor terminals 15c to 15f, respectively, at the outside of the frame 24. This prevents solder from splashing and does not give a thermal influence to the control substrate 25 housed in the frame 24 or component parts such as the power substrate and the like. It is therefore possible to prevent short circuit caused by the splashing of solder, whereas the control unit 19 is assembled with ease.

In addition, the partition walls 34a to 34c are arranged between the lands 32a to 32d that are connected and the sensor terminals 15c to 15f, respectively, thereby preventing solder from splashing to adjacent lands or the connection portions of the sensor terminals.

Furthermore, the lands 32a to 32d of the connection terminals 28a to 28d spaced apart from the control substrate 25 are respectively connected with the sensor terminals 15c to 15f by soldering together. This prevents the thermal influence caused by soldering, thereby ensuring the reliability of the sensor signals obtained from the torque sensor 15.

Moreover, when the sensor terminals 15c to 15f protruding toward the vehicle rear side from the insertion holes 30 are inserted into the insertion holes 30 having a tapered shape of the sensor terminal holding portion 29, the leading ends of the sensor terminals 15c to 15f are easy to pass through the through hole 31 of the lands 32a to 32d of the connection terminals 28a to 28d, respectively. This enables the control unit 19 to be mounted onto the control unit mounting portion 20 of the reduction gearbox 4 smoothly, and also enables the soldering operation of the lands 32a to 32d and the sensor terminals 15c to 15f with ease.

Additionally, the lands 32a to 32d of the connection terminals 28a to 28d are arranged to have a certain gap t from the wall at which the insertion holes 30 of the sensor terminal holding portion 29 are opened. Thus, the heat of the lands 32a to 32d is not released to the sensor terminal holding portion 29 side at the time of soldering the sensor terminals 15c to 15f, thereby enabling the soldering in an efficient manner.

Further, the leg portions 33a to 33d integrally formed on the lateral side of the lands 32a to 32d are abutted with the wall of the sensor terminal holding portion 29. Therefore, even if the connection terminals 28a to 28d excessively push the lands 32a to 32d at the soldering operation and are likely to deform, the leg portions 33a to 33d push back. The connection terminals 28a to 28d slightly deform in a direction where the leg portions 33a to 33d are not provided. Accordingly, it is possible to fall the deformation within an elastic deformation range of the connection terminals 28a to 28d. Then, since the leg portions 33a to 33d set the reference positions of the lands 32a to 32d, the connection operation of the connection terminals 28a to 28d and the sensor terminals 15c to 15f can be automated by machinery.

Figure 7:
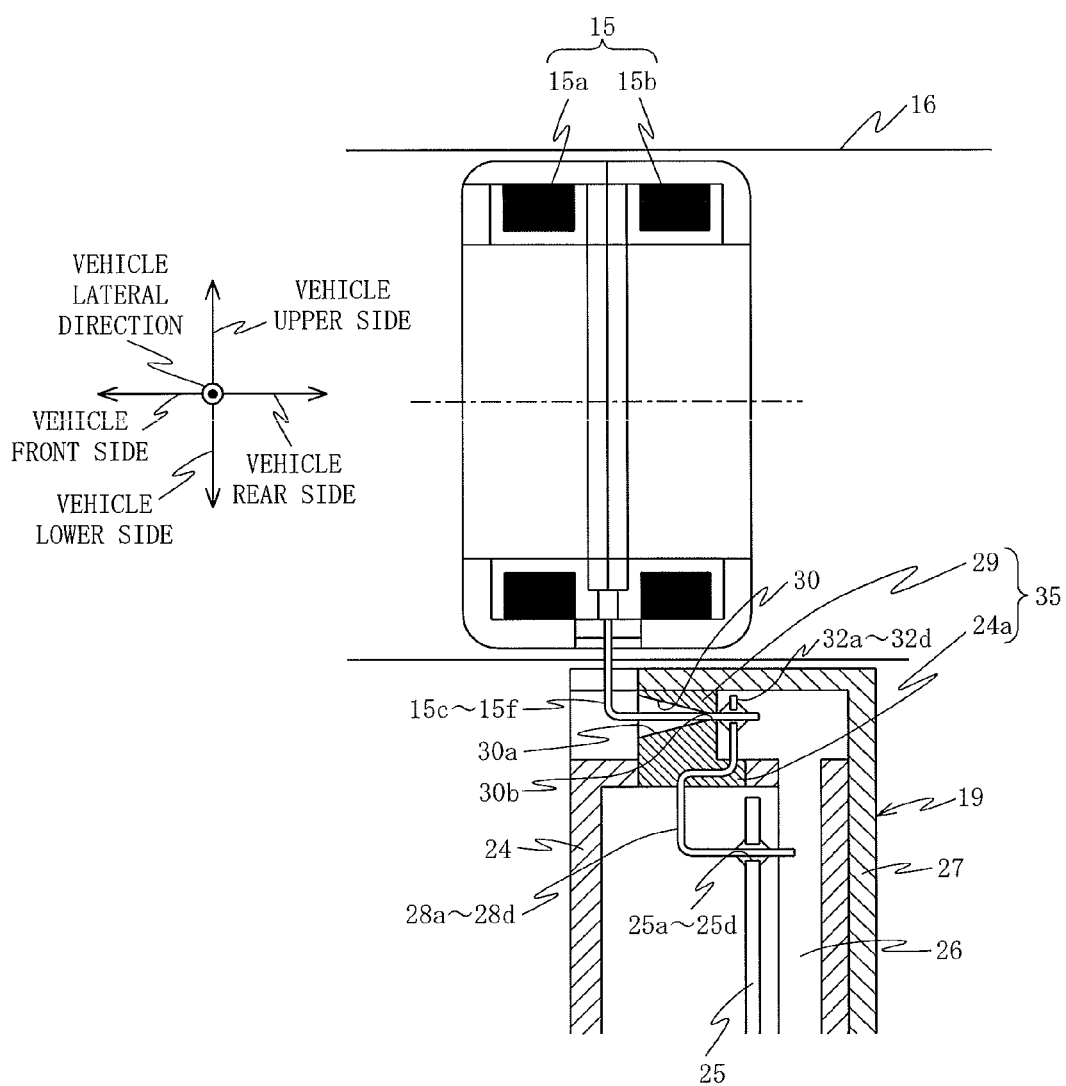
FIG. 7 is a view schematically illustrative of the connection state of sensor terminals of the torque sensor and the through holes arranged in the control substrate of the control unit according to another embodiment.

Now, FIG. 7 illustrates the control unit 19 according to another embodiment of the present invention. However, in FIG. 7, the same component parts as those illustrated in FIG. 4 have the same reference numerals, and a detailed explanation will be omitted.

The control unit 19 according to the present embodiment is configured such that a cartridge 35, in which the sensor terminal holding portion 29 for insertion-holding the sensor terminals 15c to 15f and a connection terminal holding portion 24a for holding the connection terminals 28a to 28d are integrated, is detachably disposed at the frame 24.

The electric power steering apparatus has specifications in which the position of the control unit mounting portion 20 of the reduction gearbox 4 or the height to the position at which the sensor terminals 15c to 15f are each bent in a letter L shape is varied depending on a change in the gear ratio, the outer diameter size of the torque sensor 15, or the like.

According to the present embodiment, in a case where the cartridge 35 is detachably disposed at the frame 24, it is possible to change it to the cartridge 35 provided with the sensor terminal holding portion 29 capable of holding the sensor terminals 15c to 15f for satisfying the above-described specifications and the connection terminal holding portion 24a for holding the connection terminals 28a to 28d to correspond to the sensor terminals 15c to 15f. It is thus possible to improve the versatility of the electric power steering apparatus 1.

In addition, each of the connection terminals 28a to 28d may have a two-divided structure, including one part to be soldered to the through holes 25a to 25d of the control substrate 25, and the other part to be insert-molded to the connection terminal holding portion 24a of the cartridge 35 to extend toward the exit side opening portion 30b side of the sensor terminal holding portion 29, so as to further improve the detachability of the cartridge 35 from the frame 24.

Furthermore, the provision of multiple leg portions for each of the lands 32a to 32d prevents the deformation of the connection terminals 28a to 28d.

The description has been given of the case where the brush motor is employed as the electric motor 5. However, the present invention is not limited to this. The present invention may employ a brushless motor in which the rotor is provided in the motor case. In this case, the connection terminals 5c and 5d may only be connected to the power supplying side of the excitation coil of each phase, and in addition, the power substrate 23 may only be provided with an inverter circuit having an electric field effect transistor (FET) for driving the brushless motor and a gate driving circuit for driving the gate of the field effect transistor in the inverter circuit with the pulse width modulation signals.

Moreover, in the above embodiments, the description has been given of a case where the present invention is applied to a vehicle with the steering wheel on the right side. However, the present invention is not limited to this. In a case where the present invention is applied to a vehicle with the steering wheel on the left side, the reduction gearbox 4, the electric motor 5, and the control unit 19 may only be arranged on the right side in a plane symmetry with respect to the vertical plane passing through the center axis of the steering column 3.

INDUSTRIAL APPLICABILITY

As described heretofore, an electric power steering apparatus according to the present invention is capable of preventing a defect caused by splashing of solder to a control substrate and assembling a control unit with ease, and is effective in improving the reliability of a connection structure made by soldering sensor terminals of a torque sensor and a control substrate of the control unit.

REFERENCE SIGNS LIST

1 electric power steering apparatus; 2 steering shaft; 2a input shaft; 2b torsion bar; 2c output shaft; 3 steering column; 4 reduction gearbox; 5 electric motor; 6 upper mounting bracket; 7 lower mounting bracket; 11 worm; 12 worm housing portion; 13 worm wheel; 14 worm wheel housing portion; 15 torque sensor; 15a, 15b detection coil; 15c to 15f sensor terminal; 16 torque sensor housing portion; 17 motor mounting portion; 19 control unit; 20 control unit mounting portion; 24 frame; 24a connection terminal holding portion; 24c terminal block; 25 control substrate; 25a to 25d through hole; 26 inner cover; 27 outer cover; 28a to 28d connection terminal; 29 sensor terminal holding portion; 29a wall; 30 insertion hole; 30a entrance side opening portion; 30b exit side opening portion; 31 through hole; 32a to 32d land; 33a to 33d leg portion; 34a to 34c partition wall; 35 cartridge; 45 female connector; 45a power supply connector; 45b signal connector; 60 universal joint; 61 lower shaft; 62 universal joint; t gap

The invention claimed is:

1. An electric power steering apparatus comprising:
a steering shaft through which a steering torque is transmitted;
an electric motor for transmitting a steering assist force to the steering shaft via a reduction mechanism in a reduction gearbox;
a control unit including a control substrate on which a control circuit for drive-controlling the electric motor is mounted;
a plurality of sensor terminals connected to a torque sensor included in the reduction gearbox and protruding from an outer circumference of the reduction gearbox;
a plurality of through holes arranged at the control substrate; and
a plurality of connection terminals electrically connecting the plurality of sensor terminals and the plurality of through holes, respectively, wherein
the control unit includes a frame of synthetic resin for holding the control substrate,
the frame of synthetic resin partially insert-molds the plurality of connection terminals with first ends of the plurality of connection terminals connected to the plurality of through holes, and second ends of the plurality of connection terminals protruding at the outside of the frame of synthetic resin, wherein the frame of synthetic resin includes a sensor terminal holding portion having guide openings arranged at positions opposing open ends of the plurality of sensor terminals,
the control unit is mounted on the reduction gearbox with the open ends of the plurality of sensor terminals being inserted into the guide openings, and the second ends of the plurality of connection terminals and the open ends of the plurality of sensor terminals are respectively connected by soldering together,
the second ends of the connection terminals: i) are separated from the sensor terminal holding portion by a certain gap, and ii) face the sensor terminal holding portion,
deformation preventing members configured to prevent the second ends of the connection terminals from deforming with the gap are provided, and
the deformation preventing members are leg portions provided at side faces of the second ends, respectively, and the leg portions abut a wall of the sensor terminal holding portion to prevent the second ends of the connection terminals from deforming.

2. The electric power steering apparatus according to claim 1,
wherein the open ends of the plurality of sensor terminals extend toward a vehicle rear side; and
wherein the control unit is mounted on the reduction gearbox while moving to a vehicle front side.

3. The electric power steering apparatus according to claim 1, wherein the through holes provided at the control substrate and the guide openings provided at the sensor terminal holding portion are arranged in a direction where the control unit is mounted on the reduction gearbox.

4. The electric power steering apparatus according to claim 1, wherein the second ends of the connection terminals each have a plate shaped land with a through hole, and the open ends of the sensor terminals and the lands are connected by soldering together with the open ends of the sensor terminals penetrating through the through holes passing through the guide openings of the sensor terminal holding portion.

5. The electric power steering apparatus according to claim 1, wherein the sensor terminal holding portion has partition walls for partitioning between each connected pair of the second ends of the connection terminals and the open ends of the sensor terminals.

6. An electric power steering apparatus comprising:
a steering shaft through which a steering torque is transmitted;
an electric motor for transmitting a steering assist force to the steering shaft via a reduction mechanism in a reduction gearbox;
a control unit including a control substrate on which a control circuit for drive-controlling the electric motor is mounted;
a plurality of sensor terminals connected to a torque sensor included in the reduction gearbox and protruding from an outer circumference of the reduction gearbox;
a plurality of through holes arranged at the control substrate; and
a plurality of connection terminals electrically connecting the plurality of sensor terminals and the plurality of through holes, respectively, wherein
the control unit includes a frame of synthetic resin for holding the control substrate,
the frame of synthetic resin partially insert-molds the plurality of connection terminals with first ends of the plurality of connection terminals connected to the plurality of through holes, and second ends of the plurality of connection terminals protruding at the outside of the frame of synthetic resin, wherein the frame of synthetic resin includes a sensor terminal holding portion having guide openings arranged at positions opposing open ends of the plurality of sensor terminals,
the control unit is mounted on the reduction gearbox with the open ends of the plurality of sensor terminals being inserted into the guide openings, and the other ends of the plurality of connection terminals and the open ends of the plurality of sensor terminals are respectively connected by soldering together,
the other ends of the plurality of connection terminals have a certain gap with the sensor terminal holding portion,
deformation preventing members configured to prevent the second ends of the plurality of connection terminals from deforming with the gap are provided, and
the deformation preventing members are leg portions provided at side faces of the second ends of the plurality of connection terminals, respectively, and the leg portions abut a wall of the sensor terminal holding portion to prevent the second ends of the plurality of connection terminals from deforming.

7. The electric power steering apparatus according to claim 6,
wherein the open ends of the plurality of sensor terminals extend toward a vehicle rear side; and
wherein the control unit is mounted on the reduction gearbox while moving to a vehicle front side.

8. The electric power steering apparatus according to claim 6, wherein the through holes provided at the control substrate and the guide openings provided at the sensor terminal holding portion are arranged in a direction where the control unit is mounted on the reduction gearbox.

9. The electric power steering apparatus according to claim 6, wherein the second ends of the plurality of connection terminals each have a plate shaped land with a through hole, and the open ends of the sensor terminals and the lands are connected by soldering together with the open ends of the sensor terminals penetrating through the through holes passing through the guide openings of the sensor terminal holding portion.

10. The electric power steering apparatus according to claim 6, wherein the sensor terminal holding portion has partition walls for partitioning between each connected pair of the second ends of the plurality of connection terminals and the open ends of the sensor terminals.

* * * * *